United States Patent [19]

Schnug

[11] 4,357,380

[45] Nov. 2, 1982

[54] MULTIPLE SETS, PARTICULARLY ENDLESS SETS

[75] Inventor: Lieselotte Schnug, Sachsen ueber Ansbach, Fed. Rep. of Germany

[73] Assignee: EDV-Druck Walter Schnug KG, Sachsen ueber Ansbach, Fed. Rep. of Germany

[21] Appl. No.: 95,013

[22] Filed: Nov. 16, 1979

Related U.S. Application Data

[62] Division of Ser. No. 843,619, Oct. 19, 1977, Pat. No. 4,217,384.

[30] Foreign Application Priority Data

| | | | |
|---|---|---|---|
| Mar. 2, 1977 | [DE] | Fed. Rep. of Germany | 2708910 |
| May 17, 1977 | [DE] | Fed. Rep. of Germany | 2722240 |
| Oct. 23, 1977 | [DE] | Fed. Rep. of Germany | 2648124 |

[51] Int. Cl.³ .......................... B32B 3/10; B41M 5/10; B41M 5/22

[52] U.S. Cl. .................................... 428/138; 156/256; 281/5; 281/15 R; 282/27.5; 282/28 R; 282/28 A; 428/914; 428/198; 428/200; 428/201; 428/211

[58] Field of Search .................... 156/256, 252; 281/2, 281/3 R, 5, 15 R; 282/2, 3 R, 8 R, 12 R, 14, 19 R, 22 R, 27.5, 28 R, 28 A; 428/77, 78, 137-140, 189, 191, 194, 198, 200, 211, 914, 535, 537, 201

[56] References Cited

U.S. PATENT DOCUMENTS

| | | | |
|---|---|---|---|
| Re. 20,607 | 12/1937 | Tomec | 428/139 |
| 3,320,109 | 5/1967 | Braner | 156/252 |
| 3,649,430 | 3/1972 | Lewis et al. | 428/138 |
| 3,758,355 | 9/1973 | Witherow | 156/252 |

FOREIGN PATENT DOCUMENTS

| | | | |
|---|---|---|---|
| 648313 | 5/1964 | Belgium | 156/252 |
| 718431 | 11/1954 | United Kingdom | 428/138 |

*Primary Examiner*—Bruce H. Hess
*Attorney, Agent, or Firm*—Jordan and Hamburg

[57] ABSTRACT

A multiple set particularly a multiple set as used on computers or the like includes a plurality of sheets wherein at the margin of at least some of the sheets there are provided recesses in which an adhesive is applied to thereby detachably secure the sheets together.

3 Claims, 16 Drawing Figures

FIG. 1
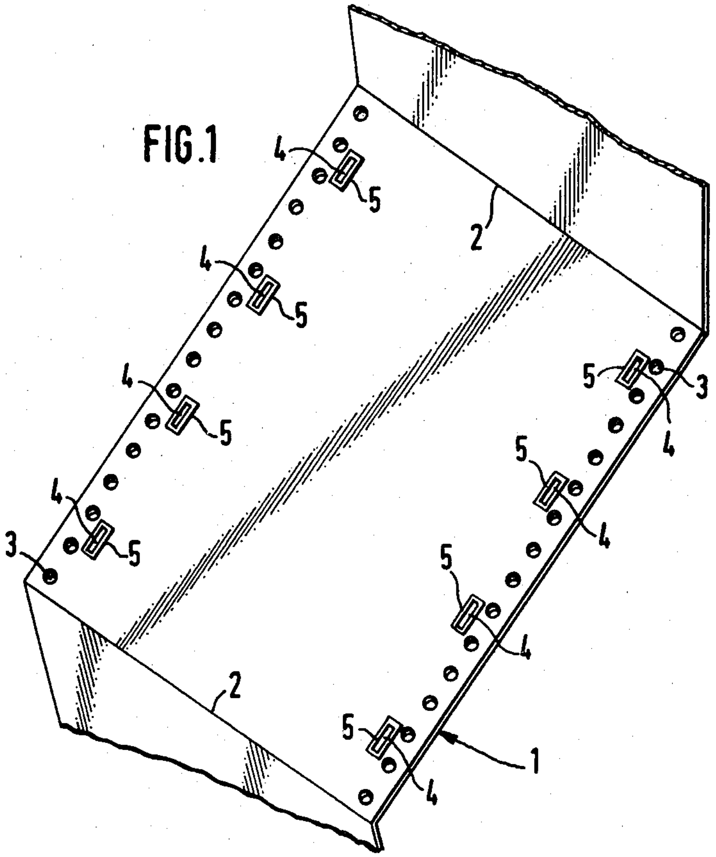
FIG. 2
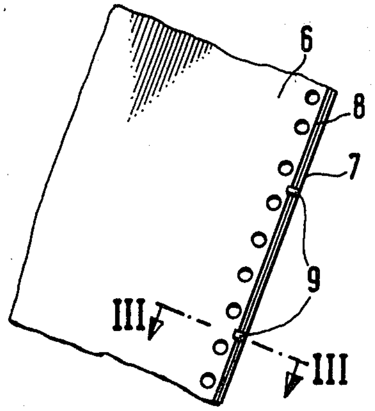
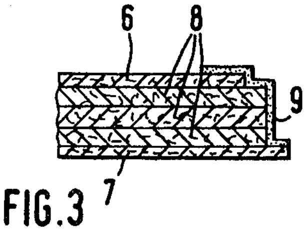
FIG. 3

FIG. 7
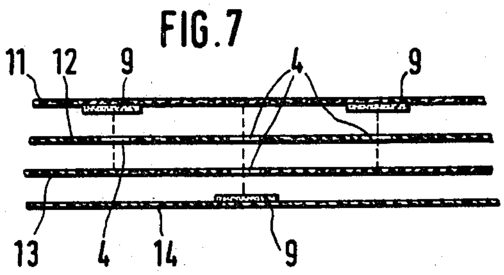
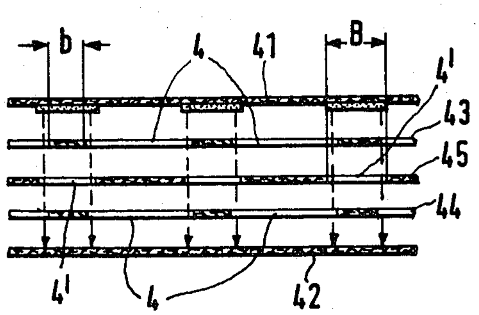
FIG. 8
FIG. 9
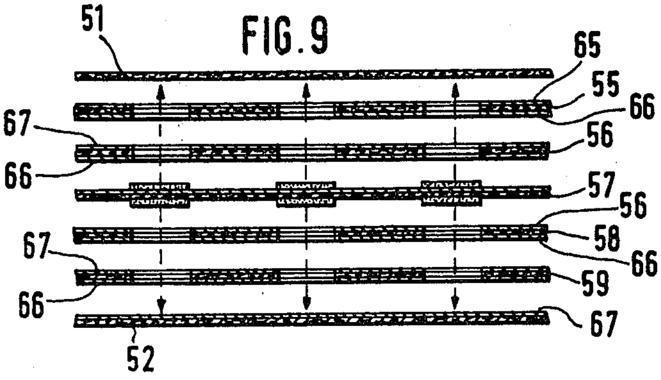

MULTIPLE SETS, PARTICULARLY ENDLESS SETS

This is a division, of application Ser. No. 843,619, filed Oct. 19, 1977, now U.S. Pat. No. 4,217,384.

BACKGROUND OF THE INVENTION

This invention relates to a multiple set, particularly an endless set with several single sheets or webs that are detachably glued together.

Multiple sets, particularly endless sets with two or more sheets or webs and, in some cases interposed carbon papers, are usually provided with a bonding in order to keep the sheets or webs together while being processed. This is particularly important for the processing of endless sets on computers.

The bonding may be done by various methods. Besides wire stitching are also known crimp-stitching, multiplex bonding (by means of paper-loops), Emerex-bonding (by means of an elastic thread), Fanlock-bonding (loop perforation), and finally the line glueing of sheet to sheet or web to web.

These known set connections do not always result in a good and sufficient securement and, moreover, are sometimes very expensive and exhibit certain other disadvantages with the necessity of using a plurality of adhesive applying devices, the number depending on the sheet-number.

Wire stitching has the disadvantage that parts of the staples may break and thus lead to aggravating disturbances in the computing system. Crimp-bonding fulfills the requirement of keeping the sheets together but barely or even less when heavy sets are to be collated.

In Emerex-bonding the thread hanging out laterally interferes and makes processing prone to troubles. Fanlock-bonding also only rarely suffices when bonding large sets. Linear glueing between single sheets or webs frequently is accompanied by the danger that little knobs or protrusions occur in the glue lines which will prevent smooth running of the computer.

Another disadvantage of the present state of the art resides in the fact that the bonding of the sets frequently requires the use of extremely complicated and expensive special equipment.

Accordingly, it is an objective of the present invention to provide a multiple or endless set which ensures a practical detachable connection of single sheets or single webs that are glued together with a single adhesive applying device, and where the glueing together of single sheets or webs may be accomplished by the aid of a device that may be added on to each and every conventional collator. In order to achieve this objective, the present invention provides that the sheets or webs are, preferably excepting the last sheet and/or the cover sheet, provided at least at one lateral edge with recesses and that the sheets or webs are connected across these recesses by an adhesive coating.

In contradistinction to the heretofore used conventional glue connections where the edges of the web had to be furnished with a glue line, the present invention allows the simple glueing of the sheets or webs of a multiple set after the collating of the sheets or webs and, in some cases, of the carbon paper sheets or webs with a single adhesive applying device. The application of an adhesive in the area of the recesses of the sheets or webs assures a sufficient adhesive bond between all sheets or webs when the adhesive is preferably applied in the form of spots or strips at a distance from each other, covering the recesses of the sheets or webs at least in one direction.

The perforated margin or a second perforated margin (Remalinerlochung) may provide the recesses for making a later glueing of all sheets possible, in which case preferably the last sheet and/or first sheet is not perforated. Particularly advantageously, the adhesion-recesses are formed as additional recesses, in which case it is advantageous to provide for this purpose vertical or horizontal recesses. The transcending glueing of the sheets or webs assures a sufficient cohesion of the sheets or webs within the area of these perforations.

Another advantageous embodiment of the multiple set and particularly the endless set results when the width of the sheets or webs is chosen to differ, so that at least at one longitudinal edge, the end sheet or end web protrudes outwardly beyond the intermediate sheets or webs and that the top sheet or web is inwardly of the intermediate sheets or webs. This difference in the width of the sheets or webs does not reduce the useful area of the sheets or webs because this variation is only made in the margin which cannot be used. On the other hand, this variation of the width does not impair the collating and straightening out of single sheets or webs when the sets are put together because the common alignment is anyhow assured by the guide holes in the sheets or webs independently of the possible lateral stop of the edges of the sheets or webs.

The gradation of the width of the sheets or webs according to the invention allows a particularly simple manufacture, because it is not important for the application of the glue, preferably provided at spaced distances, that the glue be brought into coincidence with the glue recesses which would also be located at spaced distances. Due to the glue recesses caused by the varying width of the single sheets, the glue may be provided at arbitrary positions, as long as it is assured that their distances are smaller than half the length of a single set, so that at least two glueings occur along the edge of a page and thus a distortion free binding is obtained.

It is particularly advantageous when the sheets are different in their widths that their edges are arranged in a step-shape so that each sheet will be held in its marginal area by a glue strip and not only along its edge.

Obviously this step-shaped gradation of sheets or webs is suitable for weaker or lighter sets, because the margin of the sheets allows besides the guide perforation also such a gradation of 0.5 to 1 mm from sheet to sheet.

For stronger or heavier sets, the inner sheets or webs are of the same width or divided in two groups of different widths. Experience has shown that a gradation of the upper and lower sheet or web against the inner sheet or web suffices in order to obtain a good bonding of the sheets or webs by applying strip glueings at certain distances from each other.

The embodiment of multiple, particularly endless sets according to the present invention, allows the use of particularly well working thermoplastic, so-called hotmelt adhesives which immediately after application is cooled to the extent that they set or congeal and thus immediately after application, yield the desired connection of the sheets or webs. Moreover, these hotmelt adhesives do not disturb the further processing of the sheets or webs because they are no longer sticky and are not capable of causing disturbing adhesion to parts of the machinery or on folded over or wound webs.

Besides the aforedescribed gradation of the sheets or webs, a further embodiment of the invention provides that the glue recesses, provided besides a Remalin-guide hole margin, are offset or differentially punched (for example, with holes of differing diameters) so that this method also leads to a scale-like overlapping and offset stopped array.

Another embodiment of the present invention provides for the omission of single recesses of the sheets or webs at certain positions, so that in various glue recesses, various sheets or webs are glued together.

It is particularly advantageous when the omitted glue recesses are arranged in such a manner, that for example some glue connections run from sheet 1 to 2, others from sheet 1 across sheet 2 to sheet 3, others again across sheet 1 to sheet 2 and sheet 3 and sheet 4. This practice not only leads to a particularly durable connection but also an advantageous variable group division which is particularly useful for sets of forms, where each time several sheets form a subgroup which has to be treated individually.

This latter particularly useful embodiment results, for example from leaving out in the second sheet one recess when starting at a top sheet with its recesses provided at regular distances. In the third sheet, for example one recess left and one right of the respective recess in the second sheet is omitted and so on down to the bottom, so that recesses are missing on each sheet at certain positions.

Moreover, in a further embodiment recesses may be left out in the cover sheet and in the bottom sheet and only the intermediate sheets may be furnished with variably arranged recesses in order to obtain the same heretofore described result of glueing the whole set by applying the adhesive either to the front side of the top sheet or the back side of the bottom sheet.

A further embodiment of the invention provides that the glue recesses, which are provided in addition to the customary guide hole margins, are offset relative to the holes vicinally of the guide hole margins. This method leads to a minimum loss of useful width of sheets or webs, while there is still enough material between the guide holes and the glue recesses to prevent tearing of the paper.

The embodiment according to the invention is particularly useful for sets with intercalated carbon paper sheets or webs in which case the carbon paper sheets or webs are provided with exactly the same recesses as the appropriate sheet of the set so that it belongs in each case to the same subgroup of the set.

Similarly the carbon paper sheets may partly project into the recesses of the sheets or webs of the set and may also be connected to the whole set by glueing without providing separate recesses for the carbon paper sheets or webs.

For the manufacture of multiple sets and particularly endless sets according to the present invention a rotary die cutting tool is used which is fixed on the rotary printing press with dies or die rings which are adjustable both in the direction of running and in the opposite direction. In this case the dies and the sleeves of the rings are exchangeable also so that they may be exchanged against smaller or larger dies in order to achieve by this method the aforementioned embodiment of graded edges due to variously size recesses in each web. Such exchanges provide as well for translation of the whole tool in longitudinal as well as in vertical directions.

Furthermore, it may be provided that the glue recesses and the printing are not manufactured simultaneously on a printing press but that the recesses are punched on a special die tool which has been provided additionally to the collator after the whole set has been collated. In this case the sets, as the case may be, together with the intercalated carbon paper and all other sheets and webs will be provided with recesses. All webs, sheets and carbon papers are glued together taking care that a glue repellant, Teflon-coated roller runs over the cover sheet and over the bottom sheet. According to the technique of printing (print face-up, roll-winding with pressure outwards, or print face-down and roll-winding with pressure inwards) the first or the last sheet or both may be devoid of recesses or die cuts. For this purpose the die cutting device, provided upon the automatic collator will be offset by one collating station so that the die cuts for example extend on a sextuple set only over sheets 1 to 5 according to the printing technique only over sheets 2 to 6 or 2 to 5. The application of the glue occurs in the first case on the face of the last sheet and in the second case on the back of the cover sheet, each time glue repellant couter-pressure rollers being provided.

When using carbon paper the difficulty arises of registering the recesses therein with the recesses of the overlying and underlying papers because the large tension might cause wandering of the glue recesses. On the other hand the use of "color reaction paper" prevents a smooth and permanent bond because none of the existing brands of glue allows sufficient adhesion of the glue to the side of a sheet which is coated with a micro encapsulated chemical.

In order to remove these difficulties another embodiment of the present invention provides that the sheets or webs of carbon paper or other sheets or webs which are not provided with glue hole margins, are in such a way provided with recesses that in a longitudinal direction, the width of the bridges between the recesses is smaller or at least identical with the hole width of the glue recesses of the sheets lying either above or below.

This embodiment makes it in any case sure, similar to the aforedescribed embodiment of the carbon sheets in such a manner that they protrude only partly in the glue recesses of the above and below lying paper, that independently of the longitudinal order of the carbon paper sheets in relation to the neighboring sheets there exists one transversal recess allowing the passing through of the glue. Thus there is no chance that an unfavorable longitudinal offset distribution of the glue recesses of the carbon paper could cover completely the bridges between the glue recesses of the vicinal sheet.

When using color reaction paper the first sheet or web should consist according to the invention of ordinary paper and the second sheet or web should be self-reacting on its face and reacting or donating on its backside. The consecutive sheets are CFB in other words the front side is accepting and the backside is coated with donor microcapsules. The bottom sheet is frontally accepting (CF).

When one of the intercalated sheets or webs is chosen as a carrier for the glue in such a manner that the glue is applied to both sides of this intercalated sheet, this sheet should be acceptor-coated on its frontal side, while the underneath lying sheet or web is self-reactive on its front side and coated with capsules on its backside. When color reaction paper is used, even when chosing an intercalated sheet as a glue carrier, the first sheet must be an ordinary paper in order to prevent a coating of capsules on its backside, which would prevent a good bond.

The device for the manufacture of multiple sets or endless sets according to the invention may as a further embodiment be provided with a pressure device in tandem with the glueing station, that is a pressure roller in order to assure a satisfactory distribution of the glue.

Moreover, it is also within the scope of the present invention to furnish the device for the manufacture of multiple sets or endless sets according to the invention with a blower combined with a heating or cooling device in order to shorten the so-called "open-time" of the glue. When cold glue is used, heating may considerably shorten the open time, in other words the time where a bond has not yet occurred which might prevent slippage. The same applies to cooling when a hot glue is used. Heating or cooling may occur, as desired, either from above or below.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The constructions and operation of the invention, however, together with additional objects and advantages thereof will be best understood from the following description of the specific embodiments when read in connection with the accompanying drawings.

BRIEF DESCRIPTION OF THE DRAWINGS

FIG. 1 is a partial perspective view of an endless set according to one embodiment of the invention.

FIG. 2 is a small segment of another embodiment of an endless set according to the invention.

FIG. 3 is a cross sectional view taken along the line III—III in FIG. 2 extending across the marginal area of the endless set.

FIG. 7 is a partial schematic view of another embodiment.

FIG. 8 is a schematic sectional view through another embodiment of a multiple set according to the invention.

FIG. 9 is a sectional view through a further embodiment of the invention.

DESCRIPTION OF THE PREFERRED EMBODIMENTS

Figure 4:
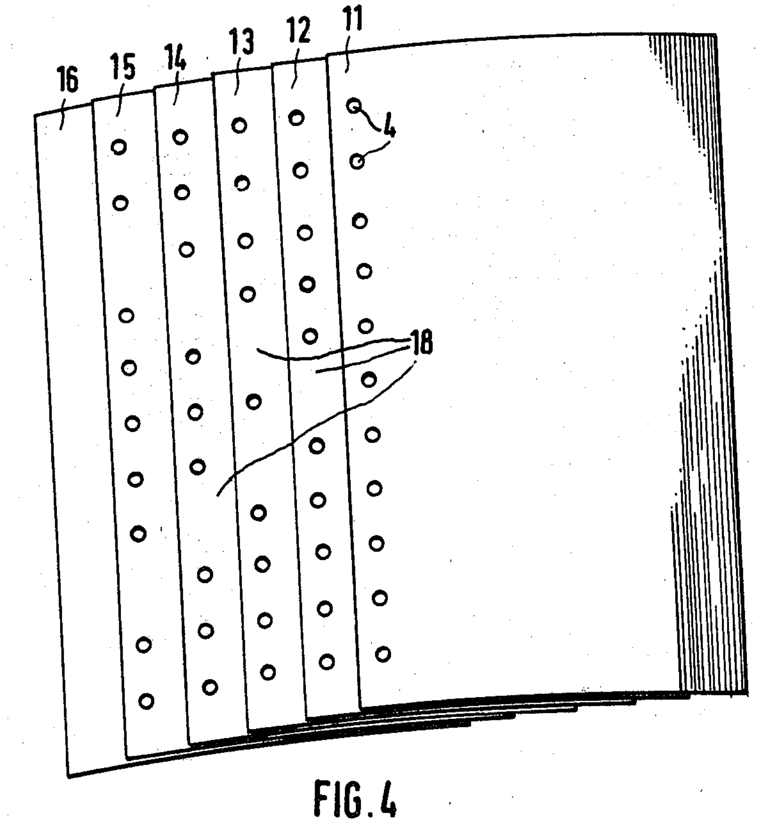
FIG. 4 is a fanned presentation of sheets lying one above the other with omissions of the glue recesses according to the invention.

An endless set 1 shown in FIG. 1 consists of a plurality of single sets which are provided along the lines 2 with perforated edges for easier divisibility. The endless set 1 has guide holes 3 and also perforations or recesses 4 for the securing together of sheets lying above but not shown. In the area of each die cut hole or recess 4 there is applied an adhesive or glue means, prefereably a so-called hotmelt adhesive to form a glue line 5. The adhesive or glue is applied in such a manner that it permeates the recesses 4 formed by the die operation and causes in this way a permanent bond between the single sheets, that nevertheless is easily detached.

The segment of another embodiment is shown in FIG. 2 and has a first page 6 that is narrower and a bottom sheet 7 that is wider than the intermediate sheets which are generally indicated at 8. The sheets are arranged in such a manner that the narrower or wider width of at least one lateral edge forms a step-shaped grading along at least one edge, as shown in FIGS. 2 and 3. Thus glue lines applied at spaced distances from each other ensure easily detachable glueing of the single sheets or sheets 6 to 8 in which case again the glueing may occur only after collating.

Instead of the embodiment shown in FIGS. 2 and 3, where the three intermediate sheets 8 of the set consisting of five sheets have identical widths so that the customary edge outside the guide holes suffices for the grading of the widths even when the sets are thick, it may of course, be provided that the width of each single sheet differs from the next one so that all webs form a continuous step-shaped grading along one or both lateral edges. That results in an even better glue bond between the single sheets.

Finally, it would also be possible to provide separate glue recesses or glue-diecuts in single webs or sheets offset in such a way, longitudinally or laterally, that a scale-like or stepped overlap results, particularly so that the overall offset of the glue recesses between the first sheet and the bottom sheet is smaller than the length of a glue recess measured in the direction of the offset.

This particular embodiment leads to a good service-life of the glueing. It is as good as when the step-shaped gradation by differing width is used and does not require different widths of the sheets.

FIG. 4 shows single sheets 11 to 16 of a multiple set or endless sets where a top sheet 11 is provided with glue recesses 4 at regular intervals and where the recesses are omitted in the various underlying sheets at the positions 18. This arrangement succeeds, easily noticeable in FIG. 6, in connecting sheet 11 and sheet 12 by the application of glue at 5*a* while the application of glue at 5*b* also bonds the sheets 11, 12 and 13, and in the consecutive position 5*c*, the sheets 11 to 14 are adhesively bonded.

Figure 6:
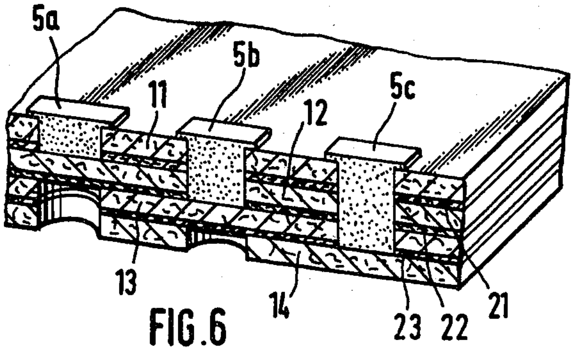
FIG. 6 is an enlarged sectional view taken along line VI—VI in FIG. 5.

FIG. 6 differs from the arrangement of FIG. 4 by also interposing carbon paper sheets 21, 22 and 23 which are basically also provided with recesses just like the superimposed sheets 11, 12 or 13.

Figure 5:
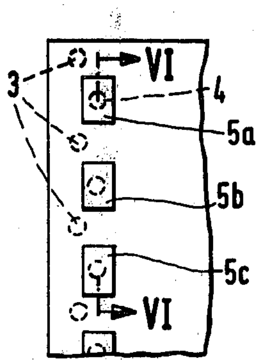
FIG. 5 is a partial view of a set according to another embodiment.

FIG. 5 shows by broken lines that a conventional guide hole margin is provided with conventional guide holes 3. The glue recesses 4 are offset by one gap between the guide holes 3 so closely to the guide hole margin that scarcely any useful space is wasted, all as shown in FIG. 5. Simultaneously, sufficient spacing exists between the guide holes 3 and the glue recesses 4 so that any tears in the paper are prevented.

FIG. 7 showns schematically a section through a set, consisting of 4 sheets 11 to 14 where the top sheet 11 and the bottom sheet 14 have some glue recesses omitted, and preferably all-through glue recesses are lacking. The glue application 9 occurs on the inner side of the cover sheet 11 and the bottom sheet 14, which causes the glue to be pressed through the superimposed sheets, a fact which is suggested schematically in the expanded representation shown in FIG. 7. There is no need, however, to omit the recesses from the cover sheet 11 and the bottom sheet 14 as shown in FIG. 7 in that such omission could be provided in one of the sheets only. If only the cover sheet 11 or the bottom sheet 14 is provided with recesses 4, it will be necessary to use a counter pressure roller to these spots. The roller will prevent oozing out of glue through the apertures and prevent smudging of the area or sticking to the machinery by being coated with a glue repellant Teflon layer.

Of course it would be possible in the embodiments of FIGS. 4 to 7 to either slightly offset the recesses of each sheet or web (beginning either at the cover sheet or at the bottom sheet) or to utilize different diameters, so that a step-like overlapping of the edges results.

FIG. 8 shows a multiple set where the cover sheet 41 and the bottom sheet 42 each are prepared without recesses and where the glue is applied to the underside of the cover sheet. Numerals 43 and 44 are carbon paper sheets which, in contradistinction to the sheets 41, 42 and 45 are not provided with guide hole margins, so that it is not possible to register exactly the glue recesses 4 of the carbon papers and the glue recesses 4' of the intermediate sheet 45, or to register the respective other intermediate sheets which are provided with guide hole margins. Nevertheless in order to make sure that in each case the glue which is applied to the underside of the cover sheet 41 is pressed through all the way to the bottom sheet 42, the length b of the bridging space between the recesses 4 of the carbon paper sheets 43, 44 measured in a longitudinal direction, is chosen to be smaller than the length B of the glue recess 4', also measured in a longitudinal direction. Therefore, the bridge space can, independent of the longitudinal direction of the carbon papers, under no circumstances ever completely cover the glue recesses of the sheets lying above or below so that passing through of the glue will never be prevented.

FIG. 9 shows a schematic section through a multiple set when using a color reaction paper, in other words without carbon paper interlayers. In this embodiment the glue is not applied to the underside of the cover sheet 51 or to the top side of the bottom sheet 52, but the glue is applied to the upper and the under side of an intermediate sheet 57. Due to the poor adhesion of the glue to a paper coated with microcapsules, an ordinary paper is used as a cover sheet so that the glue can produce a good bond of the intermediate sheet 57 and the cover sheet 51 and also penetrate the sheets 55 and 56 which lie inbetween. The sheet 55 under the cover sheet 51 is provided on its front with a self-reacting layer 65 and on its backside with a donating microcapsule layer 66. The sheets 56 and 57 are CFB paper in other words they are provided frontally with an accepting layer and in the back with a donor layer of micro encapsulate. The intermediate sheet 57 which serves as the glue carrier lacks a donor microcapsule layer on its underside in order to give a better bond. Consequently, the underlying sheet 58 must be provided with a self-reacting coating 65. The bottom sheet 52 has only on its front an acceptor layer 67.

Figure 10:
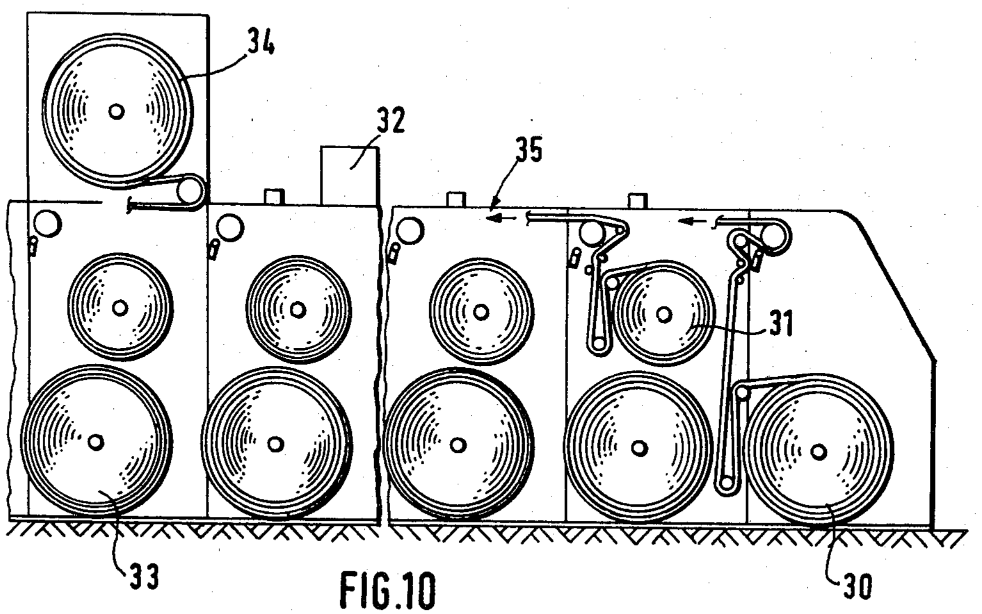
FIG. 10 is a schematic partial view of a collator built according to the invention.

FIG. 10 is a partial schematic front view of a collator which serves to collate or combine multiple sets and endless sets where 30 indicates a roller receiver for printing paper and 31 a roller receiver for carbon paper each with the respective paper guides.

According to the invention, a die arrangement 32 is provided at the collator which punches holes directly upon the collator into all intermediate sheets of a multiple set. The final or bottom sheet passing off the roller 33 and the cover sheet passing off the roll 34 should have no holes or recesses in a preferred embodiment of the invention of a multiple set. Therefore, the roll 34 for the cover sheet is arranged behind the die cutter 32 above the collator plane 35. This simple variation of a collator, where the rolls are usually arranged either above or below the collator plane, thereby makes it possible to prepare sets according to the invention with hole-free top and bottom sheets with simultaneous preparation of the glue recesses by a die cutter 32 disposed upon the collator.

The glue applicator shown in FIG. 10 is arranged in such a manner that it applies glue to the underside of the top sheet and/or the top side of the bottom sheet prior to the collating of these sheets with the intermediate sheets into which the die cutter 32 has punched holes.

Moreover, it would be within the scope of the invention, particularly with endless multiple sets with sheets of different widths where a graded margin effects an improved bond, to achieve an embodiment where at least at one longitudinal margin, the cover sheet and the bottom sheet protrude outwardly relative to the intermediate sheets, in other words where only the intermediate sheets extend less than the cover sheet and the bottom sheet.

Figure 11:
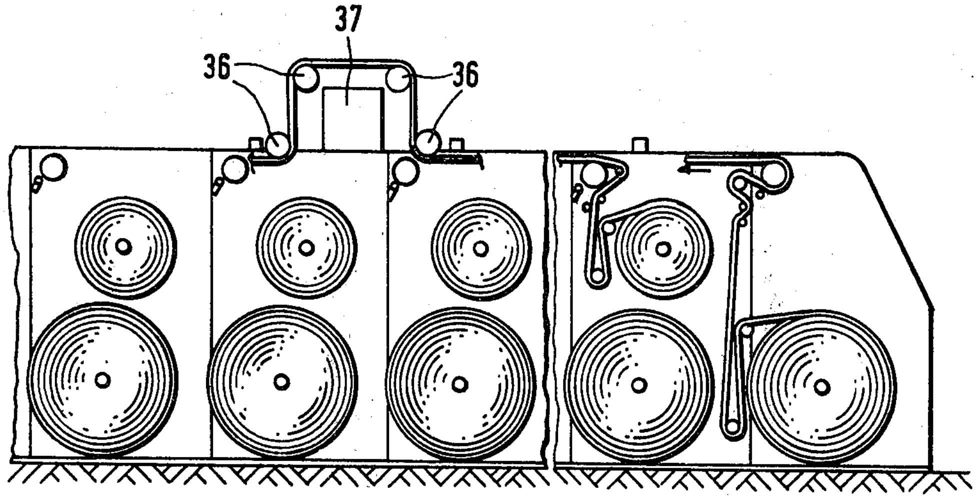
FIG. 11 is a schematic partial view of a collator according to another embodiment.

FIG. 11 shows an embodiment of a collator which varies in comparison to the one shown in FIG. 10. Instead of the arrangement of providing the roll 34 for the cover sheet above the collator plane as in FIG. 10, the arrangement in FIG. 11 provides for a deviating or steering device consisting of the rollers 36. This device guides the web or sheet pulled off the anterior roll 30 which web or sheet is used to form the cover sheet, in an appropriate way to provide an underlying space where a device 37 (shown schematically) may be emplaced. This device 37 may be a gluer or a die cutter.

Figure 12:
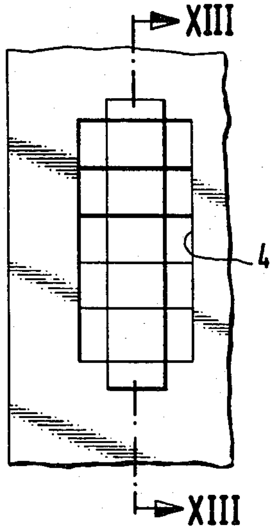
FIG. 12 is a partial view of a set according to another embodiment.
Figure 13:
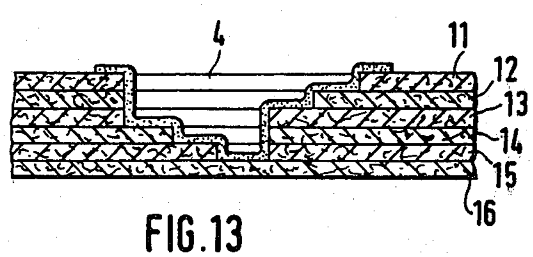
FIG. 13 is a schematic view taken along the line XIII—XIII in FIG. 12.

When the glue recesses in sheets lying one above the other are arranged like scales or in an overlapping stepped array, in other words when these glue recesses are arranged in the longitudinal direction of the sheets and all offset, then a considerable gradient occurs between the first and the last sheet, and the application of glue may be difficult at the lowest point. Besides applying the glue in reverse order as shown in FIGS. 12 and 13, a symetrical arrangement of the recesses 4 may be provided in which case the recesses 4 (as in FIG. 4) in single sheets 11 to 15 do not have to differ in size, but may have the same size. They only have to be arranged in a respective oppositely directed offset so that the last sheet 16, which has no recess, accepts a glue spot approximately in the center of the recess 4 of the upper sheet 11. FIG. 13 shows that this method causes lower heights of step than a monotonic step-offset from the top most to the bottom sheet.

Figure 14:
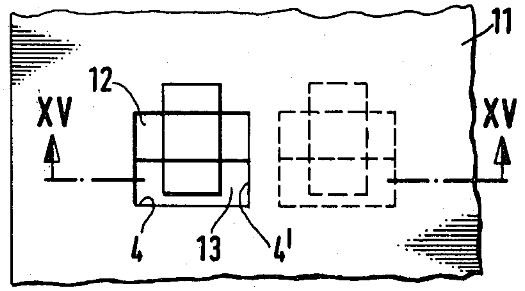
FIG. 14 is a partial view of a multiple set according to yet another embodiment.
Figure 15:
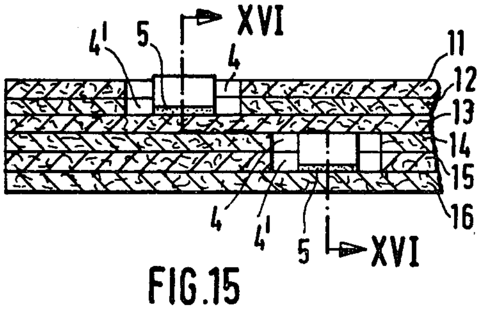
FIG. 15 is a sectional view taken along the line XV—XV in FIG. 14.
Figure 16:
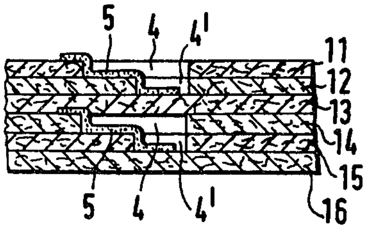
FIG. 16 is a sectional view taken along the line XVI—XVI in FIG. 15.

FIGS. 14 to 16 finally show an embodiment where each set is, according to its heavyness or thickness, divided in two parts and where the recesses of one set-part are offset in relation to the recesses of the other set-part while the connection of the two set-parts is performed by an intermediate sheet 13 having no recesses. The sheets 11, 12 or 14, 15 are provided with step-shaped recesses, in this case too the recesses 4 or 4' may have the same size so that a part of the recesses 4' in the sheets 12 or 15 would be covered by the sheet lying above, are each connected by a glue spot 5 together with the intermediate sheet 13 (or in the lower set-half together with the bottom sheet 16) which has no recesses. This method of set preparation results not only in two united set-parts, independent of each other, but the application of glue is improved because the aforementioned deep steps do not occur.

It is thought that the invention and many of its attendant advantages will be understood from the foregoing description and that it will be apparent that various changes may be made in the form, constructions, and arrangements of the parts without departing from the spirit and scope of the invention or sacrificing all of its material advantages. The form heretofore described being merely a preferred embodiment thereof.

What is claimed is:

1. A multiple set of readily detachable paper sheets, comprising a plurality of paper sheets including a pair of imperforate outer sheets and a plurality of intermediate sheets disposed between said outer sheets, said intermediate sheets having communicating recesses terminated by said imperforate outer sheets, some of said communicating recesses extending through one group of intermediate sheets and other of said communicating recesses extending through another group of intermediate sheets, and adhesive means each in the form of a discrete integral mass of adhesive applied by a single adhesive applying operation to at least one of said outer sheets, said discrete integral mass of adhesive being disposed in said communicating recesses and contacting said intermediate sheets and said outer sheets to thereby detachably secure all of said sheets together to thereby form a multiple set of readily detachable sheets in which individual sheets may be readily detached while the remaining sheets in the multiple set remain adhesively secured together, said intermediate sheets having a plurality of spaced openings separated by bridging portions, said openings defining in part said communicating recesses, the length of said openings in one direction in at least one of said intermediate sheets being greater than the length of said bridging portion in said one direction in at least another of said intermediate sheets such that communication between the openings of said one and said another intermediate sheets is maintained independently of the relative position in said one direction of said one and said another intermediate sheets.

2. A multiple set according to claim 1 wherein some of said communicating recesses terminate at one outer sheet and other communicating recesses terminate at the other outer sheet, said adhesive means being applied and disposed to portions of the inside of the respective outer sheets of which the respective communicating recess terminates.

3. A multiple sheet according to claim 1 wherein said another intermediate sheet is carbon paper.

* * * * *